United States Patent
Nakagawa et al.

(10) Patent No.: US 8,017,700 B2
(45) Date of Patent: Sep. 13, 2011

(54) POLYCARBOSILANE, METHOD FOR PRODUCING SAME, SILICA COMPOSITION FOR COATING APPLICATION, AND SILICA FILM

(75) Inventors: Hisashi Nakagawa, Tsukuba (JP); Masahiro Akiyama, Auderghem (BE); Tsuyoshi Furukawa, Tsukubashi (JP); Naohisa Tokushige, Tsuchiurashi (JP)

(73) Assignee: JSR Corporation, Tokyo (JP)

( * ) Notice: Subject to any disclaimer, the term of this patent is extended or adjusted under 35 U.S.C. 154(b) by 482 days.

(21) Appl. No.: 12/093,254

(22) PCT Filed: Oct. 24, 2006

(86) PCT No.: PCT/JP2006/321148
§ 371 (c)(1),
(2), (4) Date: Oct. 14, 2008

(87) PCT Pub. No.: WO2007/055097
PCT Pub. Date: May 18, 2007

(65) Prior Publication Data
US 2009/0281237 A1    Nov. 12, 2009

(30) Foreign Application Priority Data

Nov. 11, 2005 (JP) .................. 2005-327758
Nov. 11, 2005 (JP) .................. 2005-327759

(51) Int. Cl.
*C08G 77/12* (2006.01)
(52) U.S. Cl. ......................... 525/474; 528/35
(58) Field of Classification Search .......... 525/474; 528/35
See application file for complete search history.

(56) References Cited

U.S. PATENT DOCUMENTS

| | | | |
|---|---|---|---|
| 5,602,060 A | 2/1997 | Kobayashi et al. | |
| 5,811,564 A | 9/1998 | Barnard et al. | |
| 6,761,975 B1 * | 7/2004 | Chen et al. | 428/429 |
| 7,358,317 B2 | 4/2008 | Nakagawa et al. | |
| 2003/0017635 A1 | 1/2003 | Apen et al. | |
| 2006/0134336 A1 | 6/2006 | Nakagawa et al. | |
| 2007/0015892 A1 | 1/2007 | Nakagawa et al. | |
| 2007/0021580 A1 | 1/2007 | Nakagawa et al. | |
| 2007/0027287 A1 | 2/2007 | Akiyama et al. | |

FOREIGN PATENT DOCUMENTS

| | | |
|---|---|---|
| JP | 1 138229 | 5/1989 |
| JP | 6 256526 | 9/1994 |
| JP | 8 510292 | 10/1996 |
| JP | 2003 142477 | 5/2003 |
| JP | 2006 111741 | 4/2006 |
| JP | 2006 117917 | 5/2006 |

OTHER PUBLICATIONS

Yajima, S. et al., "Synthesis of continuous silicon carbide fibre with high tensile strength and high Young's modulus", Journal of Materials Science, vol. 13, pp. 2569-2576, (1978).
K., Chris et al., "synthesis and Structure of a Highly Branched Polycarbosilane Derived from (Chloromethyl)trichlorosilane", Organometallics, vol. 10, pp. 1336-1344, (1991).
Interrante, L.V. et al., "Poly (silylenemethylenes)—a novel class of organosilicon polymers", Journal of Organometallic Chemistry, Elsevier, vol. 521, pp. 1-10, (1996).
U.S. Appl. No. 12/473,861, filed May 28, 2009, Nobe, et al.
U.S. Appl. No. 12/717,225, filed Mar. 4, 2010, Akiyama, et al.
U.S. Appl. No. 12/749,735, filed Mar. 30, 2010, Nobe, et al.
U.S. Appl. No. 12/278,224, filed Aug. 4, 2008, Nakagawa, et al.
U.S. Appl. No. 12/527,327, filed Aug. 14, 2009, Nakagawa, et al.
U.S. Appl. No. 12/934,806, filed Sep. 27, 2010, Nakagawa, et al.

\* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

A polycarbosilane has a main chain in which silicon atoms and carbon atoms are alternately repeated, and includes a structural unit shown by the following general formula (1), a structural unit shown by the following general formula (2), a structural unit shown by the following general formula (3), and a structural unit shown by the following general formula (4).

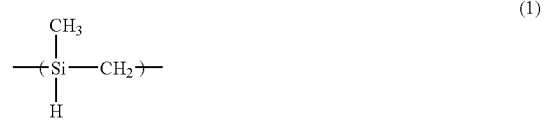

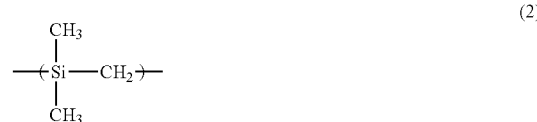

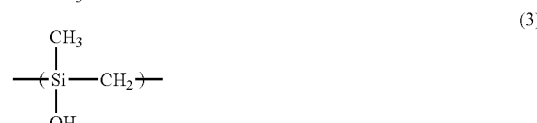

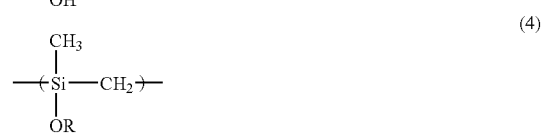

14 Claims, No Drawings

POLYCARBOSILANE, METHOD FOR PRODUCING SAME, SILICA COMPOSITION FOR COATING APPLICATION, AND SILICA FILM

TECHNICAL FIELD

The present invention relates to a novel polycarbosilane, a method for producing the same, a silica coating composition containing the polycarbosilane, and a silica film obtained using the silica coating composition.

A polycarbosilane has attracted attention as a precursor for silicon carbide fibers and ceramic materials, and has been industrially utilized. In particular, a polycarbosilane having a main chain formed of a repeating structure containing a silicon atom and a carbon atom exhibits excellent heat resistance and has been widely used. A polycarbosilane is expected to be applied to optical functional materials, conductive materials, and the like.

As a method of producing a polycarbosilane having a main chain formed of a repeating structure containing a silicon atom and a carbon atom, a method utilizing thermal rearrangement of poly(dimethylsilane) is known (Journal of Materials Science, pp. 2569 to 2576, Vol. 13, 1978), for example. According to this method, some methyl groups bonded to the silicon atoms of poly(dimethylsilane) are inserted into Si—Si bonds of the main chain to form Si—C bonds, and the rearranged Si—CH$_3$ sites are replaced by Si—H bonds.

Further examples of the method of producing a polycarbosilane include a method which produces a polycarbosilane from chloromethyltrichlorosilane via a Grignard reaction (Organometallics, pp. 1336 to 1344, Vol. 10, 1991) and a method which produces a polycarbosilane by ring-opening polymerization of a disilacyclobutane (Journal of Organometallic Chemistry, pp. 1 to 10, Vol. 521, 1996). According to these documents, a polycarbosilane having an Si—H bond is produced by replacing a substituent on a silicon atom of a monomer by a chlorine atom, polymerizing the monomers, and reducing the resulting polymer using lithium aluminum hydride or the like.

BACKGROUND ART

According to related-art technology, a polycarbosilane is generally cured by (i) forming Si—O—Si bonds by firing in an oxidizing atmosphere (U.S. Pat. No. 5,602,060 and US-A-2003/0017635), or (ii) forming Si—Si bonds by coupling Si—H bonds and then forming Si—C—Si bonds via a rearrangement reaction (US-A-2003/0017635).

However, when the method (i) is utilized for a semiconductor integrated circuit production process, metal wires formed on a substrate may be oxidized so that the wiring resistance may increase. According to the method (ii), a curing reaction proceeds to a larger extent as the Si—H bond content of the polymer increases. However, a dehydrogenation coupling reaction gradually occurs during storage due to the high Si—H bond content, whereby the polymer may deteriorate.

As a polycarbosilane which solves the above problems, can be cured under reduced pressure or an inert gas atmosphere, and is chemically stable, (i) a polycarbosilane which has a crosslinkable side chain other than the Si—H bond or is readily cured by heating or the like due to introduction of a moderately crosslinked structure before crosslinking, or (ii) a polycarbosilane which further has an appropriate number of Si—H bond side chains which enable a dehydrogenation coupling reaction is preferable. In the case of a polycarbosilane which can be cured only by the mechanism described in (i), the number of crosslinked sites in the polymer increases. As a result, thermal stability and mechanical strength may decrease when the crosslinked site is an organic group. When the crosslinked site has a siloxane structure, resistance to processing such as etching and plasma processing may decrease in semiconductor integrated circuit applications.

US-A-2003/0017635 discloses a method which applies a polycarbosilane which does not have an Si—O bond to a silicon wafer and heats the polycarbosilane in air to form an Si—O—Si bond via oxidation, and JP-A-2003-142477 and JP-T-8-510292 disclose polymers obtained by modifying a polycarbosilane having an Si—H bond in an organic solvent using alkali and water. However, a polycarbosilane which does not affect other materials such as wires when applied to a semiconductor integrated circuit production process and exhibits excellent storage stability has not yet been obtained.

DISCLOSURE OF THE INVENTION

An object of the invention is to provide a polycarbosilane which rarely produces large particles and exhibits excellent curability, a method for producing the same, a silica coating composition containing the polycarbosilane, and a silica film obtained using the silica coating composition.

According to one aspect of the invention, there is provided a polycarbosilane having a main chain in which silicon atoms and carbon atoms are alternately repeated, and comprising a structural unit shown by the following general formula (1), a structural unit shown by the following general formula (2), a structural unit shown by the following general formula (3), and a structural unit shown by the following general formula (4).

wherein R represents a monovalent hydrocarbon group.

The above polycarbosilane may further comprise at least one of structural units shown by the following formulas (5) to (9).

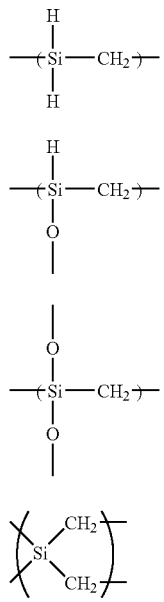

According to another aspect of the invention, there is provided a method for producing a polycarbosilane comprising reacting a raw material polymer having a main chain in which silicon atoms and carbon atoms are alternately repeated and containing a structural unit shown by the following general formula (1) and a structural unit shown by the following general formula (2) with an alcohol in an organic solvent in the presence of a basic catalyst, and reacting the resulting product with water.

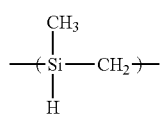

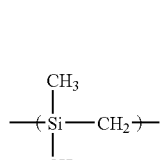

In the above method for producing a polycarbosilane, the raw material polymer may further contain at least one of a structural unit shown by the following formula (5), a structural unit shown by the following formula (8), and a structural unit shown by the following formula (9).

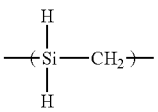

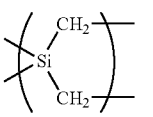

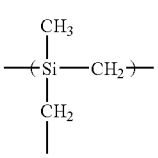

In the above method for producing a polycarbosilane, the reaction with water may be carried out by adding an acidic aqueous solution to the reaction system.

According to another aspect of the invention, there is provided a polycarbosilane produced by the above method for producing a polycarbosilane.

The above polycarbosilane may comprise at least one of structural units shown by the following formulas (1) to (9).

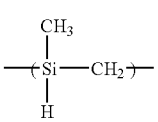

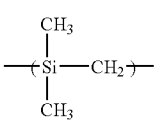

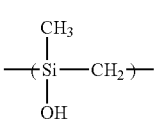

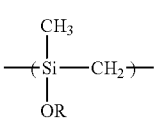

wherein R represents a monovalent hydrocarbon group.

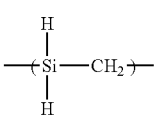

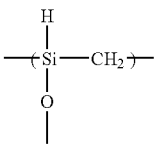

-continued

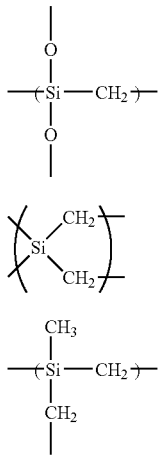

The above polycarbosilane may have a weight average molecular weight of 300 to 1,000,000 and be soluble in an organic solvent.

According to another aspect of the invention, there is provided a silica coating composition comprising the above polycarbosilane and an organic solvent.

According to a further aspect of the invention, there is provided a silica film produced by curing a coating formed using the above silica coating composition.

Since the above polycarbosilane comprises a structural unit shown by the general formula (1), a structural unit shown by the general formula (2), a structural unit shown by the general formula (3), and a structural unit shown by the general formula (4), or is produced by the above production method, the above polycarbosilane rarely produces large particles and exhibits excellent curability.

Since the above polycarbosilane contains an Si—H bond and an Si—O bond, the polymer can be crosslinked and cured by firing even in a non-oxidizing atmosphere (e.g., inert gas atmosphere or under reduced pressure). Since the above polycarbosilane contains an Si-Me site, the above polycarbosilane exhibits excellent etching resistance and ashing properties.

The above polycarbosilane may be utilized for ceramics, heat-resistant plastics, electronic materials, and the like. Since the above polycarbosilane rarely produces large particles and exhibits excellent curability, the above polycarbosilane is useful for a film-forming composition utilized for electronic materials (e.g., an interlayer dielectric for semiconductor devices, an etching stopper film, a protective film (e.g., surface coating film) for semiconductor devices, an intermediate layer used in the semiconductor production process utilizing a multilayer resist, an interlayer dielectric for multilayered wiring boards, a protective film and an insulating film for liquid crystal display devices, optical functional materials, and conductive materials).

Since the above method for producing a polycarbosilane comprises reacting a raw material polymer having a main chain in which silicon atoms and carbon atoms are alternately repeated and containing a structural unit shown by the general formula (1) and a structural unit shown by the general formula (2) with an alcohol in an organic solvent in the presence of a basic catalyst, and reacting the resulting product with water, gelation does not occur during production. Therefore, a polycarbosilane which rarely produces large particles and exhibits excellent curability can be produced.

Since the above silica coating composition comprises the above polycarbosilane and the organic solvent, a film can be easily formed by applying the silica coating composition.

Since the above silica film is produced by curing a coating formed using the above silica coating composition, the above silica film is uniform.

BEST MODE FOR CARRYING OUT THE INVENTION

A polycarbosilane according to one embodiment of the invention, a method for producing the same, a silica coating composition containing the polycarbosilane, and a silica film formed using the silica coating composition are described below.

1. First Embodiment (Polycarbosilane)

A polycarbosilane according to this embodiment has a main chain in which silicon atoms and carbon atoms are alternately repeated, and includes a structural unit shown by the following general formula (1), a structural unit shown by the following general formula (2), a structural unit shown by the following general formula (3), and a structural unit shown by the following general formula (4). Specifically, the polycarbosilane according to this embodiment has a main chain in which silicon atoms and carbon atoms are alternately repeated, and side chains respectively containing a hydrogen atom, an oxygen atom, and a carbon atom bonded to the silicon atoms in the main chain.

In the polycarbosilane according to this embodiment, identical structural units among the structural units shown by the following general formulas (1) to (4) may be adjacent to each other, or different structural units among the structural units shown by the following general formulas (1) to (4) may be adjacent to each other. The polycarbosilane according to this embodiment may have a portion in which identical structural units are adjacent to each other and a portion in which different structural units are adjacent to each other.

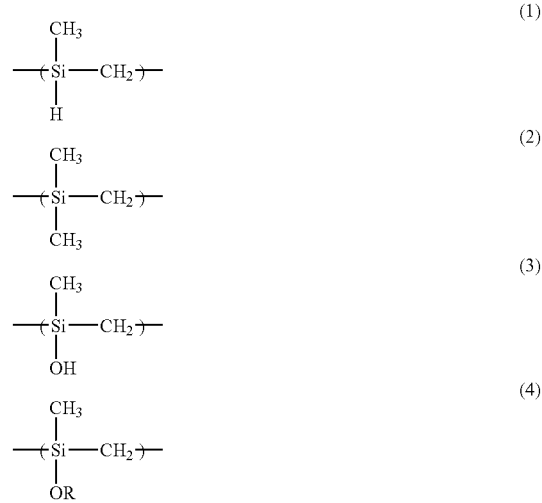

wherein R represents a monovalent hydrocarbon group.

Specifically, the polycarbosilane according to this embodiment includes at least one structural unit shown by the general formula (1), at least one structural unit shown by the general formula (2), at least one structural unit shown by the general formula (3), and at least one structural unit shown by the general formula (4). More specifically, the polycarbosilane according to this embodiment contains —H, —CH₃, —OH, and —OR in the side chains. These side chains are bonded to the Si atoms in the main chain.

Examples of the monovalent hydrocarbon group represented by R in the general formula (4) include, but are not limited to, an alkyl group, an aryl group, an alkenyl group, and an alkynyl group. When R represents an alkyl group, R preferably represents an alkyl group having 1 to 6 carbon atoms.

The term "main chain in which silicon atoms and carbon atoms are alternately repeated" used in the invention refers to a structure shown by the following general formula (10), for example. In the general formula (10), side chains bonded to the main chain are omitted. The number of silicon atoms and the number of carbon atoms contained in the main chain are not limited to those shown in the general formula (10). The type of side chain bonded to the main chain is not particularly limited. For example, the side chain may be —H, —OH, —O—Si, or —OR' (wherein R' represents a monovalent hydrocarbon group, and may be a group mentioned as R in the general formula (4), for example. Specifically, R' may be a monovalent hydrocarbon group derived from an alcohol used when producing the polycarbosilane according to this embodiment).

—Si—C—Si—C—Si—C—Si—C— (10)

In the polycarbosilane according to this embodiment, the content of the structural units shown by the general formulas (1) to (4) is preferably (1) 5 to 70%, (2) 30 to 80%, (3) 5 to 50%, and (4) 5 to 30%, respectively.

The polycarbosilane according to this embodiment may further includes at least one of structural units shown by the following formulas (5) to (9). In the polycarbosilane according to this embodiment, identical structural units among the structural units shown by the following general formulas (5) to (9) may be adjacent to each other, or different structural units among the structural units shown by the following general formulas (5) to (9) may be adjacent to each other. The polycarbosilane according to this embodiment may have a portion in which identical structural units are adjacent to each other and a portion in which different structural units are adjacent to each other.

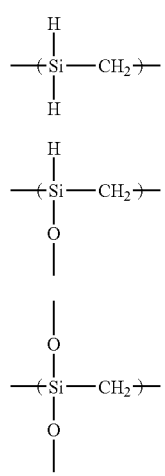

(5)

(6)

(7)

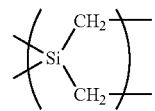

(8)

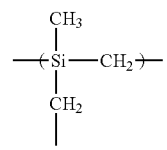

(9)

In the general formulas (6) and (7), the oxygen atom may bond to a hydrogen atom, a silicon atom, or a carbon atom. In the general formulas (8) and (9), the carbon atom of the methylene (—CH₂—) may be bonded to an oxygen atom, a silicon atom, or a carbon atom.

The polycarbosilane according to this embodiment is soluble in an organic solvent, and preferably has a weight average molecular weight of 300 to 1,000,000, and more preferably 500 to 100,000. If the weight average molecular weight of the polycarbosilane is less than 300, the polymer may volatilize during firing. If the weight average molecular weight of the polycarbosilane exceeds 1,000,000, the polymer becomes insoluble in solution. This makes it difficult to obtain a desired coating composition.

2. Second Embodiment (Method for Producing Polycarbosilane)

2.1 Production of Polycarbosilane

A method for producing a polycarbosilane according to one embodiment of the invention includes reacting a raw material polymer having a main chain in which silicon atoms and carbon atoms are alternately repeated and containing a structural unit shown by the following general formula (1) and a structural unit shown by the following general formula (2) with an alcohol in an organic solvent in the presence of a basic catalyst, and reacting the resulting product with water.

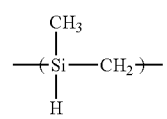

(1)

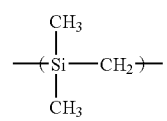

(2)

If the raw material polymer is reacted with an alcohol and water in the presence of a basic catalyst, large particles are produced during a condensation reaction, whereby gelation may occur. On the other hand, since the method for producing a polycarbosilane according to this embodiment does not cause gelation, a polycarbosilane which rarely forms large particles can be produced.

2.2 Raw Material Polymer

The raw material polymer used in the method for producing a polycarbosilane according to this embodiment includes at least one structural unit shown by the general formula (1) and at least one structural unit shown by the general formula (2). In the raw material polymer, identical structural units among the structural units shown by the general formulas (1) and (2) may be adjacent to each other, or different structural units among the structural units shown by the general formulas (1) and (2) may be adjacent to each other. The raw material polymer may have a portion in which identical structural units are adjacent to each other and a portion in which different structural units are adjacent to each other.

The raw material polymer may further include at least one of a structural unit shown by the following formula (5), a structural unit shown by the following formula (8), and a structural unit shown by the following formula (9). In this case, identical structural units may be adjacent to each other, or different structural units may be adjacent to each other. The raw material polymer may have a portion in which identical structural units are adjacent to each other and a portion in which different structural units are adjacent to each other.

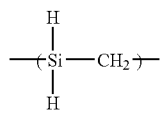

(5)

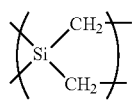

(8)

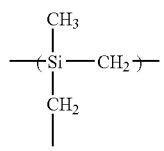

(9)

In the general formulas (8) and (9), the carbon atom of the methylene (—CH$_2$—) may be bonded to an oxygen atom, a silicon atom, or a carbon atom.

Examples of the raw material polymer used in the method for producing a polycarbosilane according to this embodiment include, but are not limited to, polymers shown by the following general formulas (11), (12), and (13). In the general formulas (11), (12), and (13), identical structural units may be adjacent to each other, or different structural units may be adjacent to each other. The polymers shown by the general formulas (11), (12), and (13) may have a portion in which identical structural units are adjacent to each other and a portion in which different structural units are adjacent to each other. This also applies to general formulas (14) to (16) described later.

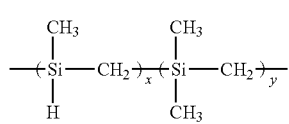

(11)

wherein x and y individually represent integers equal to or larger than one.

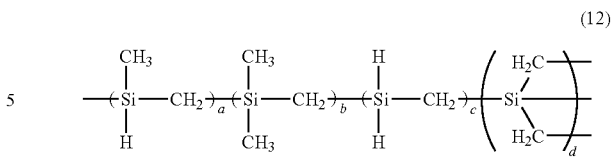

(12)

wherein a and b individually represent integers equal to or larger than one, and c and d represent integers, provided that at least one of c and d is equal to or larger than one.

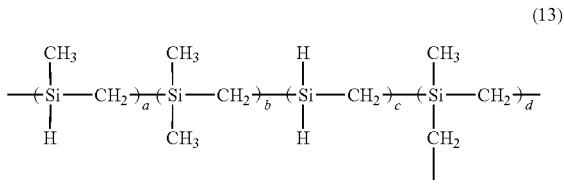

(13)

wherein a and b individually represent integers equal to or larger than one, and c and d represent integers, provided that at least one of c and d is equal to or larger than one.

2.3 Basic Catalyst

Examples of the basic catalyst which may be used in the method for producing a polycarbosilane according to this embodiment include sodium hydroxide, potassium hydroxide, lithium hydroxide, cerium hydroxide, barium hydroxide, calcium hydroxide, pyridine, pyrrole, piperazine, pyrrolidine, piperidine, picoline, ammonia, methylamine, ethylamine, propylamine, butylamine, dimethylamine, diethylamine, dipropylamine, dibutylamine, trimethylamine, triethylamine, tripropylamine, tributylamine, monoethanolamine, diethanolamine, dimethylmonoethanolamine, monomethyldiethanolamine, triethanolamine, diazabicyclooctane, diazabicyclononane, diazabicycloundecene, urea, tetramethylammonium hydroxide, tetraethylammonium hydroxide, tetrapropylammonium hydroxide, tetrabutylammonium hydroxide, benzyltrimethylammonium hydroxide, choline, and the like. Of these, ammonia, organic amines, and ammonium hydroxides are preferable, with tetramethylammonium hydroxide, tetraethylammonium hydroxide, and tetrapropylammonium hydroxide being particularly preferable. These basic catalysts may be used either individually or in combination.

The amount of basic catalyst used is determined depending on the number of Si—H bonds contained in the raw material polycarbosilane.

2.4 Alcohol

The alcohol which may be used in the method for producing a polycarbosilane according to this embodiment may be an aliphatic (linear or cyclic) alcohol or an aromatic alcohol. Examples of such an alcohol include alcohols having 1 to 6 carbon atoms. Specific examples of the alcohols having 1 to 6 carbon atoms include methanol, ethanol, n-propanol, isopropanol, n-butanol, tert-butanol, sec-butanol, n-propanol, ethylene glycol, propylene glycol, glycerol, and the like.

2.5 Organic Solvent

In the method for producing a polycarbosilane according to this embodiment, the following organic solvents may be used. As the organic solvent used in this embodiment, an organic solvent which can dissolve the alcohol used, water, and the raw material polymer is preferable. The alcohol may also be used as the organic solvent.

Examples of the organic solvent include aliphatic hydrocarbon solvents such as n-pentane, i-pentane, n-hexane, i-hexane, n-heptane, i-heptane, 2,2,4-trimethylpentane, n-octane, i-octane, cyclohexane, and methylcyclohexane; aromatic hydrocarbon solvents such as benzene, toluene, xylene, ethylbenzene, trimethylbenzene, methylethylbenzene, n-propylebenzene, i-propylebenzene, diethylbenzene, i-butylbenzene, triethylbenzene, di-1-propylbenzene, n-amylnaphthalene, and trimethylbenzene (when using a hydrocarbon solvent and water, a hydrocarbon solvent and another solvent may be used in combination); ketone solvents such as acetone, methyl ethyl ketone, methyl n-propyl ketone, methyl n-butyl ketone, diethyl ketone, methyl i-butyl ketone, methyl n-pentyl ketone, ethyl n-butyl ketone, methyl n-hexyl ketone, di-1-butyl ketone, trimethylenonane, cyclohexanone, 2-hexanone, methylcyclohexanone, 2,4-pentanedione, acetonylacetone, diacetone alcohol, acetophenone, and fenchone; ether solvents such as ethyl ether, i-propyl ether, n-butyl ether, n-hexyl ether, 2-ethylhexyl ether, ethylene oxide, 1,2-propylene oxide, dioxolane, 4-methyl dioxolane, dioxane, dimethyl dioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycol mono-2-ethyl butyl ether, ethylene glycol dibutyl ether, diethylene glycol monomethyl ether, diethylene glycol dimethyl ether (diglyme), diethylene glycol monoethyl ether, diethylene glycol diethyl ether, diethylene glycol mono-n-butyl ether, diethylene glycol di-n-butyl ether, diethylene glycol mono-n-hexyl ether, ethoxy triglycol, tetraethylene glycol di-n-butyl ether, tripropylene glycol monomethyl ether, tetrahydrofuran, and 2-methyltetrahydrofuran; nitrogen-containing solvents such as N-methylformamide, N,N-dimethylformamide, N,N-dimethylformamide, acetamide, N-methylacetamide, N,N-dimethylacetamide, N-methylpropioneamide, and N-methylpyrrolidone; sulfur-containing solvents such as dimethyl sulfide, diethyl sulfide, thiophene, tetrahydrothiophene, dimethylsulfoxide, sulfolane, and 1,3-propanesultone; alcohol solvents such as methanol, ethanol, n-propanol, isopropanol, n-butanol, tert-butanol, and sec-butanol (the alcohol solvent also serves as a reactant); and the like. These solvents may be used either individually or in combination. When used in combination with the above-mentioned solvent, aliphatic hydrocarbon solvents such as n-pentane, i-pentane, n-hexane, i-hexane, n-heptane, i-heptane, 2,2,4-trimethylpentane, n-octane, i-octane, cyclohexane, and methylcyclohexane; aromatic hydrocarbon solvents such as benzene, toluene, xylene, ethylbenzene, trimethylbenzene, methylethylbenzene, n-propylebenzene, i-propylebenzene, diethylbenzene, i-butylbenzene, triethylbenzene, di-1-propylbenzene, n-amylnaphthalene, and trimethylbenzene; and the like may also be used.

2.6 Reaction with Water

In the method of producing a polycarbosilane according to this embodiment, some of the Si—H bonds can be converted into alkoxysilane sites (Si—OR) by reacting the raw material polymer with the alcohol (ROH; R represents an alkyl group) in the organic solvent in the presence of the basic catalyst, and some of the Si—OR sites (and some of the Si—H bonds depending on the situation) can be converted into silanol sites (Si—OR) or Si—O—Si bonds. Specifically, a dehydration-condensation reaction may occur between the silanol sites after the reaction with water so that Si—O—Si bonds may be formed.

The reaction with water may be carried out by adding an acidic aqueous solution to the reaction system, for example. According to this method, a further dehydration-condensation of the silanol sites can be suppressed. The acidic aqueous solution is not particularly limited. For example, an organic acid or an inorganic acid may be used. Examples of the organic acid include acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linolic acid, linoleic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid, tartaric acid, maleic anhydride, fumaric acid, itaconic acid, succinic acid, mesaconic acid, citraconic acid, malic acid, malonic acid, hydrolysate of glutaric acid, hydrolysate of maleic anhydride, hydrolysate of phthalic anhydride, and the like. Examples of the inorganic acid include hydrochloric acid, nitric acid, sulfuric acid, hydrofluoric acid, phosphoric acid, and the like. Of these, the organic acid is preferable because polymer precipitation or gelation rarely occurs. As the organic acid, a compound containing a carboxyl group is preferable. In particular, acetic acid, oxalic acid, maleic acid, formic acid, malonic acid, phthalic acid, fumaric acid, itaconic acid, succinic acid, mesaconic acid, citraconic acid, malic acid, glutaric acid, and a hydrolysate of maleic anhydride are preferable. These acids may be used either individually or in combination.

2.7 Polycarbosilane

A polycarbosilane according to this embodiment is produced by the above-described method for producing a polycarbosilane according to this embodiment. Specifically, the polycarbosilane according to this embodiment may have a main chain in which silicon atoms and carbon atoms are alternately repeated, and side chains respectively containing a hydrogen atom, an oxygen atom, and a carbon atom bonded to the silicon atoms in the main chain.

The polycarbosilane according to this embodiment may further include at least one of structural units shown by the following formulas (1) to (9). In the polycarbosilane according to this embodiment, identical structural units among the structural units shown by the following general formulas (1) to (9) may be adjacent to each other, or different structural units among the structural units shown by the following general formulas (1) to (9) may be adjacent to each other. The polycarbosilane according to this embodiment may have a portion in which identical structural units are adjacent to each other and a portion in which different structural units are adjacent to each other.

(1)

(2)

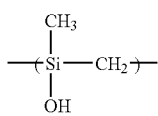
(3)

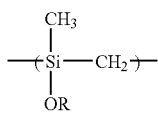
(4)

wherein R represents a monovalent hydrocarbon group.

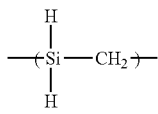
(5)

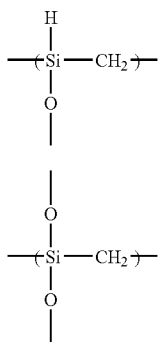
(6)

(7)

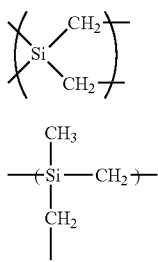
(8)

(9)

Examples of the monovalent hydrocarbon group represented by R in the general formula (4) include, but are not limited to, an alkyl group, an aryl group, an alkenyl group, and an alkynyl group. When R represents an alkyl group, R preferably represents an alkyl group having 1 to 6 carbon atoms. In the general formulas (6) and (7), the oxygen atom may bond to a hydrogen atom, a silicon atom, or a carbon atom. In the general formulas (8) and (9), the carbon atom of the methylene (—CH$_2$—) may be bonded to an oxygen atom, a silicon atom, or a carbon atom.

The polycarbosilane according to this embodiment may include the structural unit shown by the general formula (1), the structural unit shown by the general formula (2), the structural unit shown by the general formula (3), and the structural unit shown by the general formula (4). In this case, the polycarbosilane according to this embodiment contains —H, —CH$_3$, —OH, and —OR in the side chains, as shown by the general formulas (1), (2), (3), and (4). These side chains are bonded to the Si atoms in the main chain. In this case, the polycarbosilane according to this embodiment preferably has a content of the structural units shown by the general formulas (1), (2), (3), and (4) of (1) 5 to 70%, (2) 30 to 80%, (3) 5 to 50%, and (4) 5 to 30%, respectively.

The polycarbosilane according to this embodiment is soluble in an organic solvent, and preferably has a weight average molecular weight of 300 to 1,000,000, and more preferably 500 to 100,000. If the weight average molecular weight of the polycarbosilane is less than 300, the polymer may volatilize during firing. If the weight average molecular weight of the polycarbosilane exceeds 1,000,000, the polymer becomes insoluble in solution. This makes it difficult to obtain a desired coating composition.

2.8 Synthesis Example

The following general formulas show first to third synthesis examples of the polycarbosilane according to this embodiment. Note that the polycarbosilane according to this embodiment is not limited thereto.

The following general formula (A) shows the first synthesis example of the polycarbosilane according to this embodiment. The first synthesis example illustrates an example in which the raw material polymer is shown by the general formula (11).

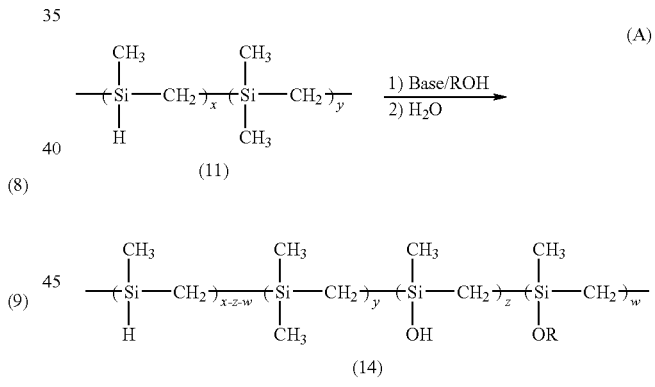

wherein z and w represent integers equal to or larger than one (provided that x>z+w is satisfied), R is the same as defined for the general formula (4), and x and y are the same as defined for the general formula (11). Specifically, some of the Si—H bonds of the raw material polymer shown by the general formula (11) are converted into Si—OR sites due to a reaction with an alcohol (ROH), and some of the Si—OR sites (and some of the Si—H bonds depending on the situation) are converted into Si—OH sites due to a reaction with water to obtain a polycarbosilane shown by the above general formula (14).

The following general formula (B) shows the second synthesis example of the polycarbosilane according to this embodiment. The second synthesis example illustrates an example in which the raw material polymer is shown by the general formula (12).

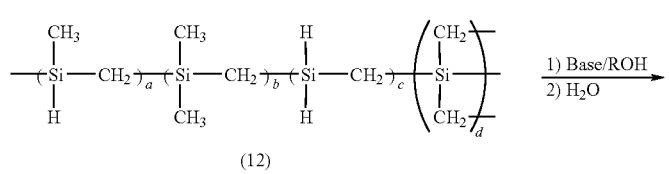

(12)

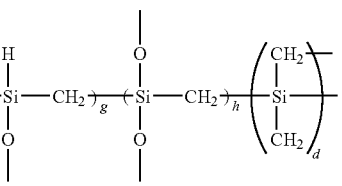

(B)

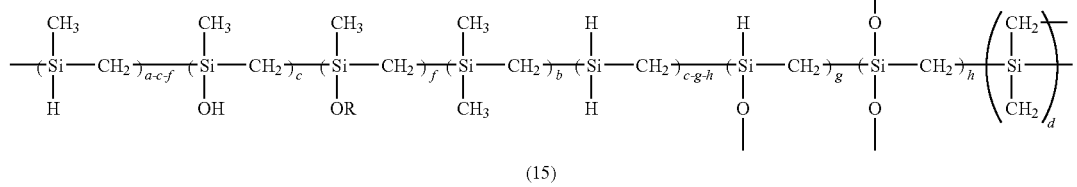

(15)

wherein e and f represent integers equal to or larger than one (provided that a>e+f is satisfied), g and h represent integers that satisfy c>g+h, R is the same as defined for the general formula (4), a, b, c, and d are the same as defined for the general formula (12), and the oxygen atoms may be bonded to a hydrogen atom, a silicon atom, or a carbon atom. Specifically, some of the Si—H bonds of the raw material polymer shown by the general formula (12) are converted into Si—OR sites due to a reaction with an alcohol (ROH), and some of the Si—OR sites (and some of the Si—H bonds depending on the situation) are converted into Si—OH sites or Si—O—Si bonds due to a reaction with water to obtain a polycarbosilane shown by the above general formula (15).

The following general formula (C) shows the third synthesis example of the polycarbosilane according to this embodiment. The third synthesis example illustrates an example in which the raw material polymer is shown by the general formula (13).

Si bonds due to a reaction with water to obtain a polycarbosilane shown by the above general formula (16).

3. Third Embodiment (Silica Coating Composition and Silica Film)

A silica coating composition according to this embodiment includes the polycarbosilane according to the above embodiment and an organic solvent. In this case, the polycarbosilane according to the above embodiment may be dissolved or dispersed in the organic solvent. The silica coating composition according to this embodiment may further include an additive, if necessary.

As the organic solvent which may be used in the silica coating composition according to this embodiment, the organic solvent which may be used in the method for producing a polycarbosilane according to the above embodiment may be utilized.

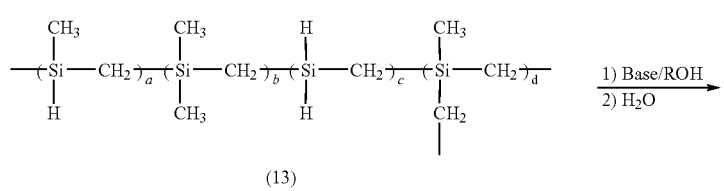

(13)

(C)

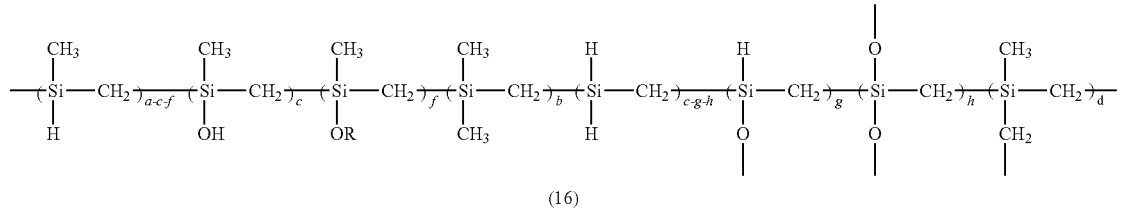

(16)

wherein e and f represent integers equal to or larger than one (provided that a>e+f is satisfied), g and h represent integers that satisfy c>g+h, R is the same as defined for the general formula (4), a, b, c, and d are the same as defined for the general formula (13), and the oxygen atoms may be bonded to a hydrogen atom, a silicon atom, or a carbon atom. Specifically, some of the Si—H bonds of the raw material polymer shown by the general formula (12) are converted into Si—OR bonds due to a reaction with an alcohol (ROH), and some of the Si—OR bonds (and some of the Si—H bonds depending on the situation) are converted into Si—OH sites or Si—O—

A silica film according to this embodiment may be produced by curing a coating formed using the silica coating composition according to this embodiment. Specifically, the silica film according to this embodiment may be produced by applying the silica coating composition according to this embodiment to a substrate to form a coating, and then curing the coating. The silica coating composition according to this embodiment may be applied to a substrate (e.g., silicon wafer, $SiO_2$ wafer, or SiN wafer) by spin coating, dip coating, roll coating, spray coating, or the like. The term "substrate" used herein refers to a member on which the silica film according to this embodiment is formed. The application and the material of the substrate are not particularly limited.

The coating may be cured by applying heat or high energy rays, for example. A hot plate, an oven, a furnace, or the like may be used as a heating means. The coating may be heated in air, nitrogen, or argon, under vacuum, or under reduced pressure while controlling the oxygen concentration. In order to control the curing speed of the coating, the coating may be heated stepwise, or the atmosphere may be selected from nitrogen, air, oxygen, or reduced pressure may be used, if necessary.

The coating may be cured by applying heat and high energy rays. For example, a coating formed by applying the silica coating composition according to this embodiment to a substrate may be cured by heating the coating at 30 to 450° C. while applying high energy rays.

Since the silica film according to this embodiment is uniform, the silica film according to this embodiment is useful for applications such as ceramics, heat-resistant plastics, and electronic materials (e.g., an interlayer dielectric for semiconductor devices such as an LSI, a system LSI, a DRAM, an SDRAM, an RDRAM, and a D-RDRAM, an etching stopper film, a protective film (e.g., surface coating film) for semiconductor devices, an intermediate layer used in the semiconductor production process utilizing a multilayer resist, an interlayer dielectric for multilayered wiring boards, a protective film and an insulating film for liquid crystal display devices, optical functional materials, and conductive materials). Note that the application of the silica film according to this embodiment is not limited thereto.

4. Examples

Examples according to the invention are described below. Note that the invention is not limited to the following examples. In the experimental examples and comparative examples, evaluations were carried out using the following methods.

4.1 Molecular Weight

The weight average molecular weight (Mw) and the number average molecular weight (Mn) of the resulting polycarbosilane were measured by gel permeation chromatography (GPC) under the following conditions.
Sample: A sample was prepared by dissolving 1 g of a polymer in 100 cc of tetrahydrofuran.
Standard polystyrene: Standard polystyrene manufactured by Pressure Chemical Company (U.S.A.) was used.
Instrument: A high-temperature/high-speed gel permeation chromatograph ("150-C ALC/GPC" manufactured by Waters Corporation (U.S.A.)).
Column: A SHODEX A-80M (length: 50 cm) manufactured by Showa Denko K.K. was used.
Measurement temperature: 40° C.
Flow rate: 1 cc/min

4.2 NMR Spectrum

The $^1$H NMR spectrum (500 MHz) and the $^{29}$Si NMR spectrum (100 MHz) of the resulting polycarbosilane were measured using the following instrument. Instrument: BRUKER AVANCE 500 (manufactured by Bruker)

4.3 Experimental Example 1

20 g of a raw material polymer ("Nipusi Type-S" manufactured by Nippon Carbon Co., Ltd.) was dissolved in tetrahydrofuran to prepare 400 g of a solution. After the addition of 5.0 ml of a methanol solution of tetramethylammonium hydroxide (TMAH) (1.0 mol/l) to the solution, the resulting reaction solution was heated at 50° C. for three hours. After cooling the reaction solution to room temperature, 10 ml of an oxalic acid aqueous solution (2.0 mol/l) was added to the reaction solution to terminate the reaction. After the addition of 100 g of cyclohexanone and 400 g of an oxalic acid aqueous solution (0.02 mol/l) to the reaction solution, the mixture was stirred and allowed to stand so that the mixture was separated into an organic phase and an aqueous phase. The organic phase was removed and concentrated to obtain 19.9 g of a polycarbosilane of Experimental Example 1.

The physical and chemical data relating to the polycarbosilane of Experimental Example 1 is given below.

$^1$H-NMR (in deuterated benzene) spectral data: −2.0 to 1.0 ppm (broad), 3.5 to 4.5 ppm (broad).

$^{29}$Si—NMR (in deuterated benzene) spectral data: −40 to −30 ppm (broad), −20 to 10 ppm (broad), 10 to 30 ppm (broad); the peaks of the latter two overlap. The integral ratio of the three peaks was about 2:6:2.

IR spectral data (liquid film): 3670 cm$^{-1}$ (corresponding to Si—OH), 2950 cm$^{-1}$, 2900 cm$^{-1}$, 2830 cm$^{-1}$ (corresponding to Si—OMe), 2096 cm$^{-1}$, 1360 cm$^{-1}$, 1250 cm$^{-1}$, 1030 cm$^{-1}$, 820 cm$^{-1}$.

Molecular weight (GPC): Mw=3200, Mn=600

A 4% butyl acetate solution of the resulting polycarbosilane was prepared, and was spin-coated onto a silicon wafer at 2500 rpm to obtain a film. The film was fired at 150° C. for one minute and at 400° C. for one minute on a hot plate in a nitrogen atmosphere. After measuring the thickness of the resulting film ("thickness after film formation" in Table 1), cyclohexanone (solvent) was spin-coated onto the wafer at 2500 rpm. The film was then cured by heating at 150° C. and 400° C. The thickness of the resulting film ("film thickness after solvent application and curing" in Table 1) was measured to compare the film thicknesses before and after applying cyclohexanone. The results are shown in Table 1. In Table 1, the term "film reduction rate (%)" indicates "{(thickness after film formation)−(film thickness after solvent application and curing)}/(thickness after film formation)×100".

The raw material polymers used in Experimental Examples 1 and 2 and Comparative Examples 1 to 3 contained a structural unit shown by the above general formula (1) and a structural unit shown by the above general formula (2).

4.4 Experimental Example 2

20 g of a raw material polymer ("Nipusi Type-S" manufactured by Nippon Carbon Co., Ltd.) was dissolved in tetrahydrofuran to prepare 400 g of a solution. After the addition of 5.0 ml of a methanol solution of tetramethylammonium hydroxide (TMAH) (1.0 mol/l) to the solution, the resulting reaction solution was heated at 50° C. for three hours. After cooling the reaction solution to room temperature, 10 ml of an oxalic acid aqueous solution (2.0 mol/l) was added to the reaction solution to terminate the reaction. The reaction solution was stirred at 50° C. for two hours. After the addition of 100 g of cyclohexanone and 400 g of an oxalic acid aqueous solution (0.02 mol/l) to the reaction solution, the mixture was stirred and allowed to stand so that the mixture was separated into an organic phase and an aqueous phase. The organic phase was removed and concentrated to obtain 19.5 g of a polycarbosilane of Experimental Example 2.

The physical and chemical data relating to the polycarbosilane of Experimental Example 2 is given below.

$^1$H-NMR (in deuterated benzene) spectral data: −2.0 to 1.0 ppm (broad), 3.5 to 4.5 ppm (broad).

$^{29}$Si—NMR (in deuterated benzene) spectral data: −40 to −30 ppm (broad), −20 to 10 ppm (broad), 10 to 30 ppm (broad); the peaks of the latter two overlap. The integral ratio of the three peaks was about 3:6:1.

IR spectral data (liquid film): 3670 cm$^{-1}$ (corresponding to Si—OH), 2950 cm$^{-1}$, 2900 cm$^{-1}$, 2830 cm$^{-1}$ (corresponding to Si—OMe), 2096 cm$^{-1}$, 1360 cm$^{-1}$, 1250 cm$^{-1}$, 1030 cm$^{-1}$, 820 cm$^{-1}$.

Molecular weight (GPC): Mw=3100, Mn=600

A film was formed using the polycarbosilane of Experimental Example 2 in the same manner as in Experimental Example 1. The solvent solubility of the film was evaluated in the same manner as in Experimental Example 1. The results are shown in Table 1.

4.5 Comparative Example 1

The physical and chemical data relating to the polycarbosilane as the raw material polymer ("Nipusi Type-S" manufactured by Nippon Carbon Co., Ltd.) is given below.

$^1$H-NMR (in deuterated benzene) spectral data: −2.0 to 1.0 ppm (broad, corresponding to Si—CH$_3$ and Si—CH$_2$), 3.5 to 4.5 ppm (broad, corresponding to SiH).

$^{29}$Si—NMR (in deuterated benzene) spectral data: −40 to −30 ppm (broad), −20 to 10 ppm (broad); the integral ratio of the two peaks was about 4:6.

IR spectral data (liquid film): 2950 cm$^{-1}$, 2900 cm$^{-1}$, 2096 cm$^{-1}$, 1360 cm$^{-1}$, 1250 cm$^{-1}$, 1030 cm$^{-1}$, 820 cm$^{-1}$.

Molecular weight (GPC): Mw=3000, Mn=500

In Comparative Example 1, a film was formed using the raw material polymer utilized in Experimental Examples 1 and 2 in the same manner as in Experimental Example 1. The solvent solubility of the film was evaluated in the same manner as in Experimental Example 1. The results are shown in Table 1.

4.6 Comparative Example 2

20 g of a raw material polymer ("Nipusi Type-S" manufactured by Nippon Carbon Co., Ltd.) was dissolved in tetrahydrofuran to prepare 400 g of a solution. After the addition of 5.0 ml of an aqueous solution of tetramethylammonium hydroxide (TMAH) (1.0 mol/l) to the solution, the resulting reaction solution was heated at 50° C. for three hours. After cooling the reaction solution to room temperature, 10 ml of an oxalic acid aqueous solution (2.0 mol/l) was added to the reaction solution to terminate the reaction. After the addition of 100 g of cyclohexanone and 400 g of an oxalic acid aqueous solution (0.02 mol/l) to the reaction solution, the mixture was stirred and allowed to stand so that the mixture was separated into an organic phase and an aqueous phase. The organic phase was removed and concentrated to obtain 19.8 g of a polycarbosilane of Comparative Example 2.

The physical and chemical data relating to the polycarbosilane of Comparative Example 2 is given below.

$^1$H-NMR (in deuterated benzene) spectral data: −2.0 to 1.0 ppm (broad), 3.5 to 4.5 ppm (broad).

$^{29}$Si—NMR (in deuterated benzene) spectral data: −40 to −30 ppm (broad), −20 to 10 ppm (broad), 10 to 30 ppm (broad); the peaks of the latter two overlap. The integral ratio of the three peaks was about 3:6:1.

IR spectral data (liquid film): 3670 cm$^{-1}$ (corresponding to Si—OH), 2950 cm$^{-1}$, 2900 cm$^{-1}$, 2096 cm$^{-1}$, 1360 cm$^{-1}$, 1250 cm$^{-1}$, 1030 cm$^{-1}$, 820 cm$^{-1}$.

Molecular weight (GPC): Mw=7100, Mn=720.

A film was formed using the polycarbosilane of Comparative Example 2 in the same manner as in Experimental Example 1. The solvent solubility of the film was evaluated in the same manner as in Experimental Example 1. The results are shown in Table 1.

4.7 Comparative Example 3

20 g of a raw material polymer ("Nipusi Type-S" manufactured by Nippon Carbon Co., Ltd.) was dissolved in tetrahydrofuran to prepare 400 g of a solution. After the addition of 5.0 ml of a methanol solution of tetramethylammonium hydroxide (TMAH) (1.0 mol/l) to the solution, the resulting reaction solution was heated at 50° C. for three hours. The reaction solution was cooled to room temperature. After the addition of 100 g of cyclohexanone and 400 g of pure water to the reaction solution, the mixture was stirred and allowed to stand so that the mixture was separated into an organic phase and an aqueous phase. The organic phase was removed and concentrated to obtain 19.9 g of a polycarbosilane of Comparative Example 3.

The physical and chemical data relating to the polycarbosilane of Comparative Example 3 is given below.

$^1$H-NMR (in deuterated benzene) spectral data: −2.0 to 1.0 ppm (broad), 3.5 to 4.5 ppm (broad).

$^{29}$Si—NMR (in deuterated benzene) spectral data: −40 to 30 ppm (broad), −20 to 10 ppm (broad), 10 to 30 ppm (broad); the peaks of the latter two overlap. The integral ratio of the three peaks was about 2:6:2.

IR spectral data (liquid film): 2950 cm$^{-1}$, 2900 cm$^{-1}$, 2830 cm$^{-1}$ (corresponding to Si—OMe), 2096 cm$^{-1}$, 1360 cm$^{-1}$, 1250 cm$^{-1}$, 1030 cm$^{-1}$, 820 cm$^{-1}$.

Molecular weight (GPC): Mw=3200, Mn=580.

A film was formed using a solution of the polycarbosilane of Comparative Example 3 in the same manner as in Experimental Example 1. The solvent solubility of the film was evaluated in the same manner as in Experimental Example 1. The results are shown in Table 1.

TABLE 1

| | Solvent for basic catalyst | Acid treatment | Thickness after film formation (nm) | Thickness after solvent application and curing (nm) | Film reduction rate (%) | Filterability through filter with pore size of 0.2 micrometers |
|---|---|---|---|---|---|---|
| Experimental Example 1 | Methanol | Conducted | 112 | 111 | 1 | No problem |
| Experimental Example 2 | Methanol | Conducted | 109 | 109 | 0 | No problem |
| Comparative Example 1 | — | — | 113 | 35 | 69 | No problem |
| Comparative Example 2 | Water | Not conducted | 110 | 110 | 0 | Filtered in an amount of less than 20 ml due to clogging |
| Comparative Example 3 | Methanol | Not conducted | 107 | 72 | 33 | No problem |

The polycarbosilanes of Experimental Examples 1 and 2 had a peak corresponding to an Si—OH site at 3670 cm$^{-1}$ and a peak corresponding to an Si—OMe site at 2830 cm$^{-1}$, as indicated by the IR spectral data. Specifically, it was confirmed that the polycarbosilanes of Experimental Example 1 and 2 had an Si—OH site and an Si—OMe site. This suggests that, in Experimental Example 1 and 2, some of the Si—H bonds of the raw material polymer were converted into Si—OMe sites by reacting the raw material polymer with the alcohol (MeOH) in the presence of the basic catalyst (TMAH), and some of the Si—OMe sites were converted into Si—OH sites due to a reaction with water. Specifically, the polycarbosilanes of Experimental Example 1 and 2 had an Si—H bond and an Si—OMe site.

As indicated by the IR spectral data relating to the polycarbosilane (raw material polymer) of Comparative Example 1, a peak corresponding to Si—OH and a peak corresponding to Si—OMe were not detected. Specifically, it was confirmed that the polycarbosilane of Comparative Example 1 did not have an Si—OH site and an Si—OMe site.

As indicated by the IR spectral data relating to the polycarbosilane of Comparative Example 2, a peak corresponding to an Si—OH site was detected, but a peak corresponding to an Si—OMe site, was not detected. Specifically, it was confirmed that the polycarbosilane of Comparative Example 2 had an Si—OH site, but substantially did not have an Si—OMe site. This suggests that, in Comparative Example 2, some of the Si—H bonds of the raw material polymer were converted into Si—OH sites by reacting the raw material polymer with water in the presence of the basic catalyst (TMAH).

As indicated by the IR spectral data relating to the polycarbosilane of Comparative Example 3, a peak corresponding to an Si—OMe site was detected, but a peak corresponding to an Si—OH site was not detected. Specifically, it was confirmed that the polycarbosilane of Comparative Example 2 had an Si—OMe site, but did not have an Si—OH site. This suggests that, in Comparative Example 2, some of the Si—H bonds of the raw material polymer were converted into Si—OMe sites by reacting the raw material polymer with the alcohol (MeOH) in the presence of the basic catalyst (TMAH).

As shown in Table 1, the polycarbosilanes of Comparative Examples 1 and 3 had a high film reduction rate. This indicates that the polycarbosilanes of Comparative Examples 1 and 3 had poor curability. In Comparative Example 2, large particles were produced due to gelation. As a result, clogging occurred during filtering through a filter with a pore size of 0.2 micrometers. On the other hand, the polycarbosilanes of Experimental Examples 1 and 2 could be filtered through a filter with a pore size of 0.2 micrometers without causing clogging, and had a very low film reduction rate. Specifically, it was confirmed that the polycarbosilanes of Experimental Example 1 and 2 rarely produced large particles and had excellent curability due to the presence of an Si—OH site and an Si—OMe site.

As is clear from the above results, since the method for producing a polycarbosilane of Experimental Example 1 and 2 includes reacting a raw material polymer having a main chain in which silicon atoms and carbon atoms are alternately repeated and containing a structural unit shown by the general formula (1) and a structural unit shown by the general formula (2) with methanol in the presence of a basic catalyst, and reacting the resulting product with water, gelation does not occur during production. Therefore, a polycarbosilane which rarely produces large particles and has excellent curability can be produced.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

The invention claimed is:

1. A polycarbosilane having a main chain in which silicon atoms and carbon atoms are alternately repeated, and comprising a structural unit shown by the following general formula (1), a structural unit shown by the following general formula (2), a structural unit shown by the following general formula (3), and a structural unit shown by the following general formula (4),

wherein R represents a monovalent hydrocarbon group.

2. The polycarbosilane according to claim 1, the polycarbosilane further comprising at least one structural unit shown by the following formulas (5) to (9),

-continued

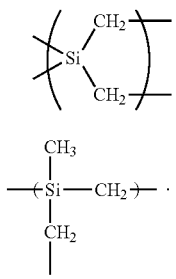

(8)

(9)

3. The polycarbosilane according to claim 1, the polycarbosilane having a weight average molecular weight of 300 to 1,000,000 and being soluble in an organic solvent.

4. A silica coating composition comprising the polycarbonate according to claim 1 and an organic solvent.

5. A silica film produced by curing a coating formed using the silica coating composition according to claim 4.

6. A method for producing a polycarbosilane comprising reacting a raw material polymer having a main chain in which silicon atoms and carbon atoms are alternately repeated and containing a structural unit shown by the following general formula (1) and a structural unit shown by the following general formula (2) with an alcohol in an organic solvent in the presence of a basic catalyst, and reacting the resulting product with water,

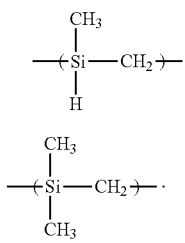

(1)

(2)

7. The method for producing a polycarbosilane according to claim 6, wherein the raw material polymer further contains at least one of a structural unit shown by the following formula (5), a structural unit shown by the following formula (8), and a structural unit shown by the following formula (9),

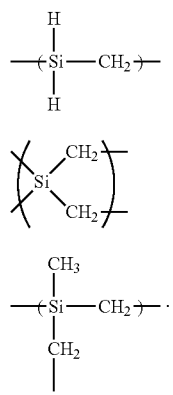

(5)

(8)

(9)

8. The method for producing a polycarbosilane according to claim 6, wherein the reaction with water is carried out by adding an acidic aqueous solution to the reaction system.

9. A polycarbosilane produced by the method for producing a polycarbosilane according to claim 6.

10. The polycarbosilane according to claim 9, the polycarbosilane comprising a structural unit shown by the following general formula (1), a structural unit shown by the following general formula (2), a structural unit shown by the following general formula (3), and a structural unit shown by the following general formula (4):

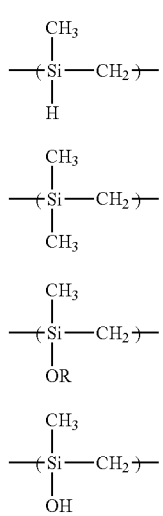

(1)

(2)

(3)

(4)

wherein R represents a monovalent hydrocarbon group.

11. The polycarbosilane according to claim 10, the polycarbosilane further comprising at least one of structural units shown by the following formulas (5) to (9), wherein R represents a monovalent hydrocarbon group,

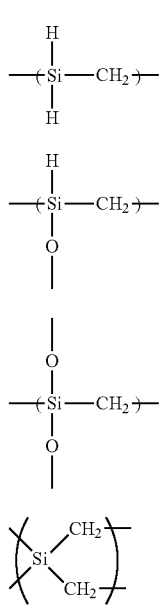

(5)

(6)

(7)

(8)

-continued

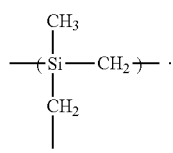
(9)

12. The polycarbonate according to claim 9, the polycarbonate having a weight average molecular weight of 300 to 1,000,000 and being soluble in an organic solvent.

13. A silica coating composition comprising the polycarbosilane according to claim 9, and an organic solvent.

14. A silica film produced by curing a coating formed using the silica coating composition according to claim 13.

* * * * *